United States Patent [19]
Harmon

[11] Patent Number: 5,719,731
[45] Date of Patent: *Feb. 17, 1998

[54] LOCKING DEVICE FOR PREVENTING UNAUTHORIZED ACCESS TO FLOPPY DISK DRIVES OF PERSONAL COMPUTERS

[75] Inventor: Thomas J. Harmon, Bel Air, Md.

[73] Assignee: Leonard Bloom, Towson, Md.; a part interest

[*] Notice: The term of this patent shall not extend beyond the expiration date of Pat. No. 5,390,514.

[21] Appl. No.: 601,235

[22] Filed: Feb. 14, 1996

[51] Int. Cl.$^6$ .................. G11B 23/28; E05B 73/00
[52] U.S. Cl. .................. 360/137; 360/97.04; 360/99.01; 369/292; 70/14; 70/58; 70/163; 70/164
[58] Field of Search .................. 360/137, 97.04, 360/99.01; 369/292; 70/14, 58, 163, 164

[56] References Cited

U.S. PATENT DOCUMENTS

| | | | |
|---|---|---|---|
| 87,645 | 3/1869 | Dante | 70/424 |
| 934,928 | 9/1909 | Michel | 70/428 |
| 1,612,656 | 12/1926 | Levy . | |
| 2,383,397 | 8/1945 | Lofqwist | 70/424 |
| 3,090,115 | 5/1963 | Carr | 29/450 |
| 4,085,599 | 4/1978 | Fischer et al. | 70/14 |
| 4,106,315 | 8/1978 | Dohanyos | 70/56 |
| 4,527,405 | 7/1985 | Renick et al. | 70/14 |
| 4,616,490 | 10/1986 | Robbins | 70/14 |
| 4,680,949 | 7/1987 | Stewart | 70/14 |
| 4,794,587 | 12/1988 | Cordiano | 369/292 |
| 4,822,671 | 4/1989 | Carper et al. | 428/33 |
| 4,887,951 | 12/1989 | Hashimoto | 411/371 |
| 4,924,683 | 5/1990 | Derman | 70/14 |
| 4,959,979 | 10/1990 | Filipow et al. | 70/58 |
| 4,964,286 | 10/1990 | Poyer | 70/58 |
| 5,076,461 | 12/1991 | Nichols | 220/352 |
| 5,109,683 | 5/1992 | Cartwright | 70/14 |
| 5,189,582 | 2/1993 | Hanson et al. | 360/132 |
| 5,390,514 | 2/1995 | Harmon | 70/14 |
| 5,394,713 | 3/1995 | Harmon | 70/58 |
| 5,400,622 | 3/1995 | Harmon | 70/14 |

FOREIGN PATENT DOCUMENTS

| | | | |
|---|---|---|---|
| 0384164 | 8/1990 | European Pat. Off. | 360/137 |
| 1085107 | 1/1955 | France | 70/14 |
| 28 24 796 | 12/1978 | Germany . | |
| 413366 | 4/1946 | Italy | 70/55 |
| 14095 | 5/1905 | Norway | 70/424 |
| WO 85/05725 | 12/1985 | WIPO | 70/58 |

*Primary Examiner*—Craig A. Renner
*Attorney, Agent, or Firm*—Leonard Bloom

[57] ABSTRACT

A locking device (10) is inserted within the disk drive (11) of a personal computer (12) to prevent unauthorized use thereof. The locking device (10) includes a part of pivoted plates (15, 16) retained in their expanded locking position by a key-operated lock (20) carried by the plates (15, 16). Each of the plates (15, 16) carries an arresting mechanism (35) which expands within the disk drive (11), in the event that an attempt is made to remove the locking device (10), and "bites" into the adjacent guide rail (53), thereby stopping any further movement of the locking device (10) out of the disk drive (11).

19 Claims, 18 Drawing Sheets

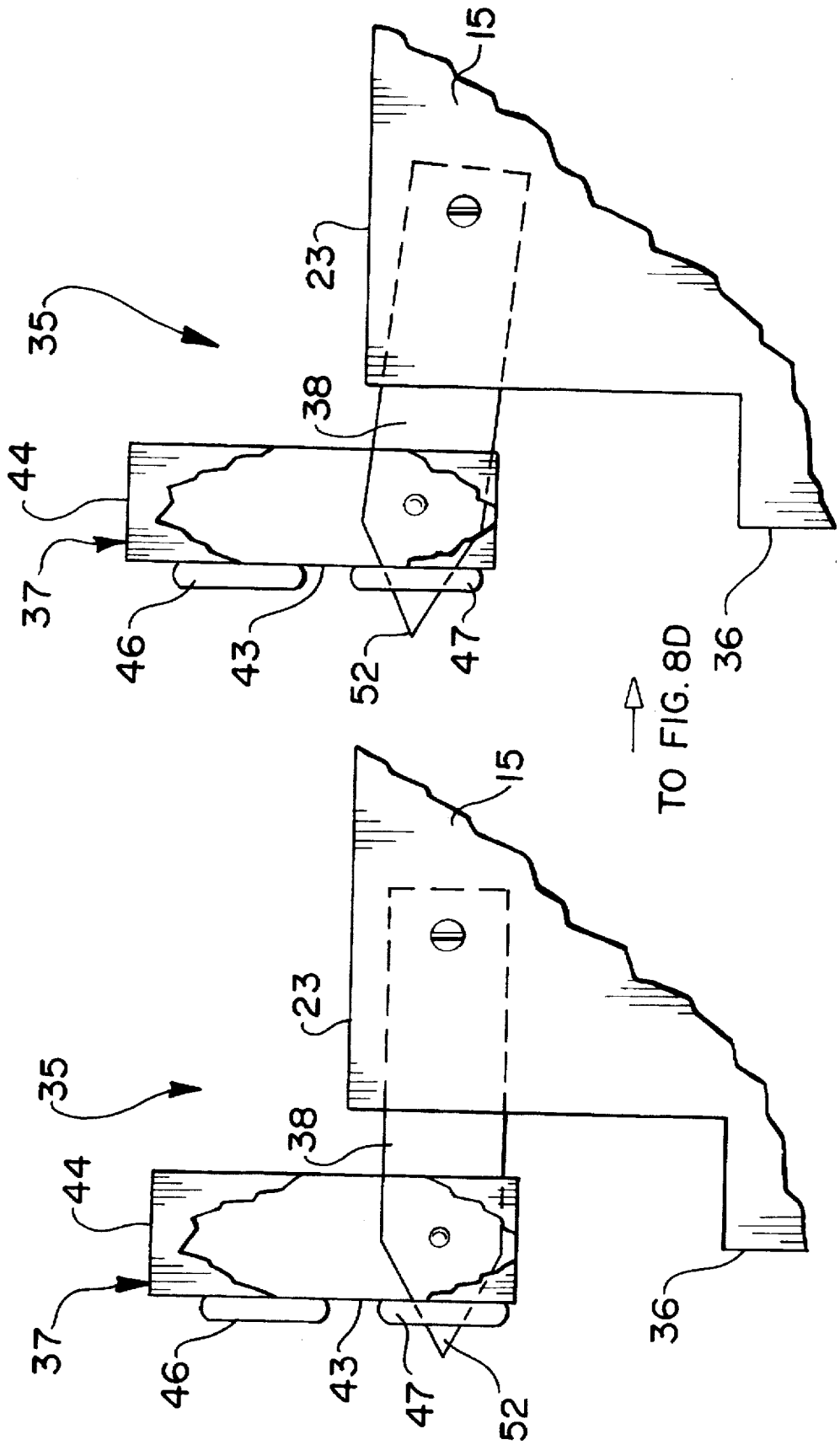

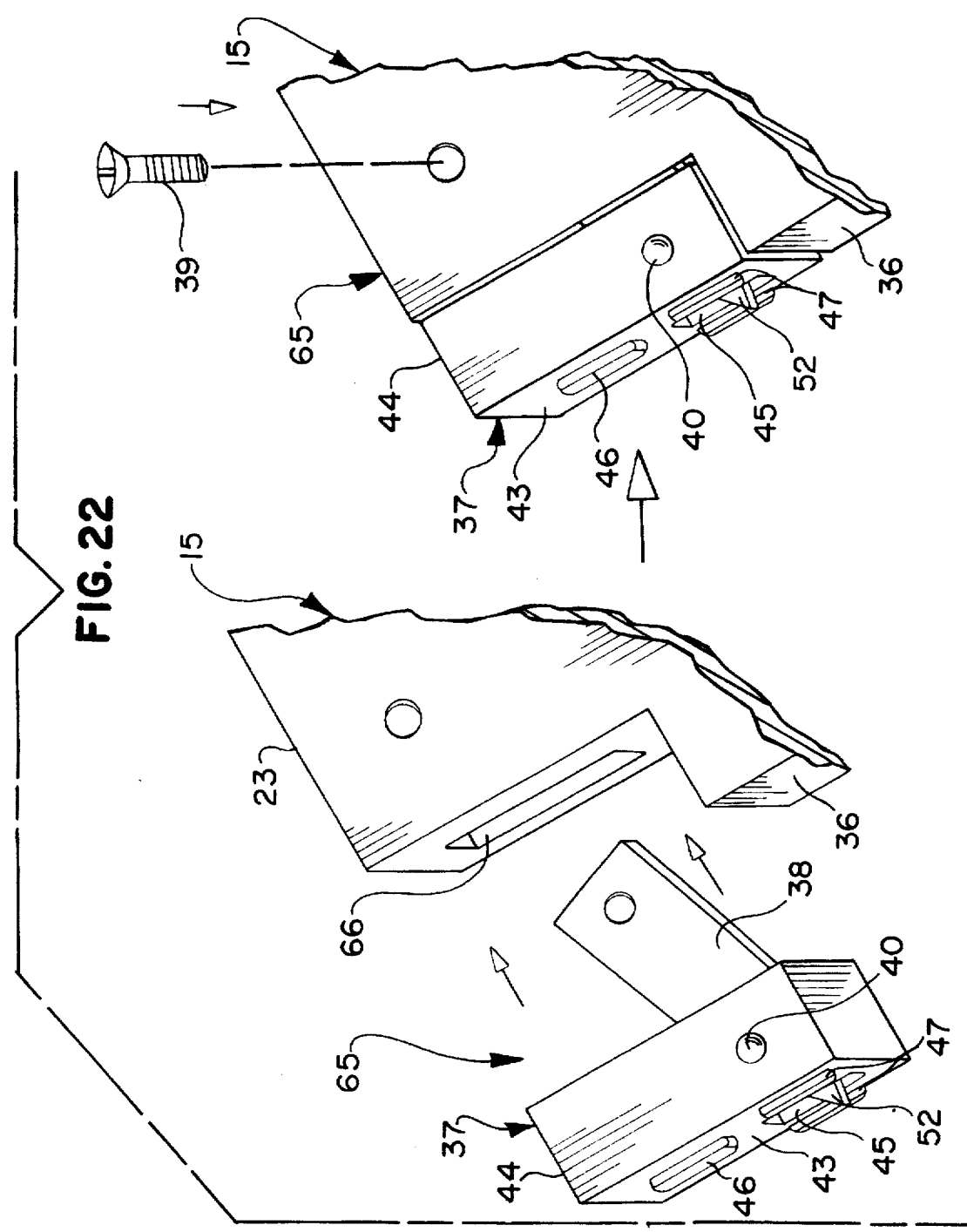

LOCKING DEVICE FOR PREVENTING UNAUTHORIZED ACCESS TO FLOPPY DISK DRIVES OF PERSONAL COMPUTERS

CROSS REFERENCE TO RELATED APPLICATIONS (Not applicable.)

STATEMENT REGARDING FEDERALLY SPONSORED RESEARCH OR DEVELOPMENT (Not applicable.)

REFERENCE TO A MICROFICHE APPENDIX SPECIFYING THE TOTAL NUMBER OF MICROFICHE AND TOTAL NUMBER OF FRAMES (Not applicable.)

BACKGROUND OF THE INVENTION

The present invention relates to locking devices for preventing unauthorized access to floppy disk drives of computers.

Personal computers and other computer systems (further altogether referred to as computers) are widely used nowadays by businesses and for residents' needs for saving, keeping and processing of personal or proprietary data which are essential to owners of the computers. It is perfectly understandable that these data are desired to be kept from access by unauthorized entities. It is essential that the information kept in the computers could not be copied onto floppy disks without authorization, since the information can get into the wrong hands, thereby harming the owner of the computers. Neither is unauthorized downloading of outside information, including unnecessary data and computer games, on the computers, welcomed since this often leads to consuming of a valuable free space on the hard disk and may lead to a virus infection of the computers.

Reliable, convenient and inexpensive locking devices for floppy disk drives are disclosed in the applicant's U.S. Pat. Nos. 5,390,514, 5,394,713 and 5,400,622.

For instance, in U.S. Pat. No. 5,400,622, the disk drive lock employs a pair of slats or plates which are pivoted at a hinge for jackknife folding. The disk drive lock may be inserted into virtually any conventional computer disk drive. Once inserted, the slats may be pivoted open, and a padlock is inserted through aligned locking holes to lock the device in the open position, thereby preventing removal from the disk drive and thwarting unauthorized access.

In U.S. Pat. No. 5,394,713, the locking device includes a pair of pivoted plates retained in their expanded position within the disk drive by means of an externally-accessible padlock or its equivalent. In one embodiment, the locking device has respective pairs of pins which sandwich the front cover of the disk drive. In another embodiment, the locking device has respective teeth which frictionally engage the respective spaced-apart side rails of the disk drive. In yet another embodiment, the locking device has both pins and teeth and is provided with a torsion spring constantly biasing the plates into their expanded position.

In U.S. Pat. No. 5,390,514, the locking device includes a pair of pivoted plates retained in their expanded locking position within the disk drive by means of an externally-accessible padlock or its equivalent. Each of the plates carries a spring finger which "bites" into the adjacent respective side rail in the event that an attempt is made to remove the locking device. The locking device is inserted into the disk drive in a one-handed operation and in its locked position. In another embodiment, a key-operated lock is carried on one of the pivoted plates.

The present invention is a further improvement to these patented locking devices and is also intended to be inserted within the disk drive of a computer in order to prevent unauthorized use thereof.

BRIEF SUMMARY OF THE INVENTION

It is, therefore, an object of the present invention to provide a locking device for a computer disk drive, wherein the locking device is tamper-evident, practical, inexpensive to manufacture, and easy to use.

In accordance with the teachings of the present invention, a removable locking device is provided for preventing unauthorized access to the disk drive of computers, such as personal computers (PCS) and other computer systems.

The locking device comprises a pair of plates,; and means are provided for pivoting the plates together, such that the plates have a folded position and an expanded position. A removable means (such as a key-operated lock or its equivalent) is provided for maintaining the plates in their expanded position. Each of the plates has a respective side edge provided with an arresting mechanism having a normal position and an expanded position. When the plates (in their folded position) are slidably inserted into the opening in the disk drive and are expanded therein, the arresting mechanism on the side edge remains in its normal position. When the plates, in their expanded position, are attempted to be removed from the opening in the disk drive, the arresting mechanism is activated and is forced into its expanded position.

In its activated position, the arresting mechanism engages the respective guide rail in the disk drive and prevents the removable locking device, in its expanded position, from being removed from the opening in the disk drive.

In order to remove the locking device from the disk drive, the key-operated (or other) lock must be deactivated to allow the plates to transform into their folded position, thereby allowing the slidable removal of the locking device out of the opening in the disk drive.

The arresting means comprises a main body, an arm having a first end and a second end, and a pivoting means. The main body is a hollow body (preferably, made of a plastic or rubber) and includes a bottom wall, a top wall, and a side wall, spacing the bottom wall from the top wall and coinciding with the side edge of a respective plate when the arresting mechanism is in its normal position. The side wall has a slot extending a part of the length thereof.

Preferably, a first rubber foot and a pair of second rubber feet are provided on the side wall. The second rubber feet are spaced apart by the slot and extend substantially parallel to and between the bottom and top walls. The first rubber foot also extends substantially parallel between the bottom and top walls.

Preferably, the pivoting means includes a first pin and a second pin. The first pin pivotally secures the first end of the arm to the plate, and the second pin pivotally secures the second end of the arm within the main body (between the bottom and top walls). It is sufficient that the second end of the arm has a teeth-shaped edge protruding through the slot on the side wall.

When the locking device (in its folded position) is inserted into the opening in the disk drive, the arresting mechanism does not engage the guide rails. But once the locking device has been inserted into the disk drive, the plates are extended to their expanded position, maintained therein by the key operated (or other) key; and the first rubber foot and the teeth-shaped edge of the arm smoothly engage inside of a respective guide rail within the disk drive, and the second rubber feet engage outside of the respective guide rail.

The locking device, if desired, can also be slidably inserted into the opening in its expanded position. Then, during the insertion, the teeth-shaped edge smoothly moves along the respective guide rail. If an attempt is made to remove the locking device (in its expanded position), the teeth-shaped edge frictionally engages the respective guide rail, thereby forcing the arm to be pivoted against the direction of movement of the locking device (out of the disk drive) thereby expanding the main body out of its normal position, and thereby stopping any further movement of the locking device in that outward direction. A distal edge of the plate restricts the clockwise rotation (or counterclockwise rotation for the arresting mechanism on another plate) of the arm beyond a desired angle.

An externally-accessible portion of the plates extends outwardly of the opening of the disk drive for carrying the key-operated lock, which has a slot and can slide along fingers extending from a proximate edge of the plate. When the plates are in their folded position, the fingers are spaced from each other. When the plates are in their expanded position, the fingers are juxtaposed to each other (engage each other) and the key operated lock can then be locked to maintain the plates in their expanded position.

Preferably, a cable can be provided for a better temper-evidence of the present locking device. The cable includes two ends. One end is secured to a side wall or a back wall of a monitor or a system unit of the computer. Another end is secured to the locking device. For this reason, each externally-accessible portion of the plates is provided with a groove (preferably semi-circular) which form a circular opening when the plates are juxtaposed with each other. For being secured to the locking device, the end of the cable is inserted between the grooves while the fingers are spaced apart. Once the plates are expanded, and the lock is closed, the end of the cable is trapped within the circular opening (formed by the two grooves).

Preferably, each of the plates has a relieved portion, such that the plates are partially nested in their folded position. A rivet between the plates serves for pivoting the plates. Preferably, an elastomeric bushing is disposed between the rivets and the plates.

These and other objects of the present invention will become apparent from a reading of the following specification taken in conjunction with the enclosed drawings.

BRIEF DESCRIPTION OF THE DRAWINGS

FIGS. 8A–8D show (in sequence) schematically transformation of the arresting mechanism from its normal position to its expanded position.

FIG. 22 shows schematically a sequence of assembling operations of the locking device of the present invention.

DESCRIPTION

Figure 1:
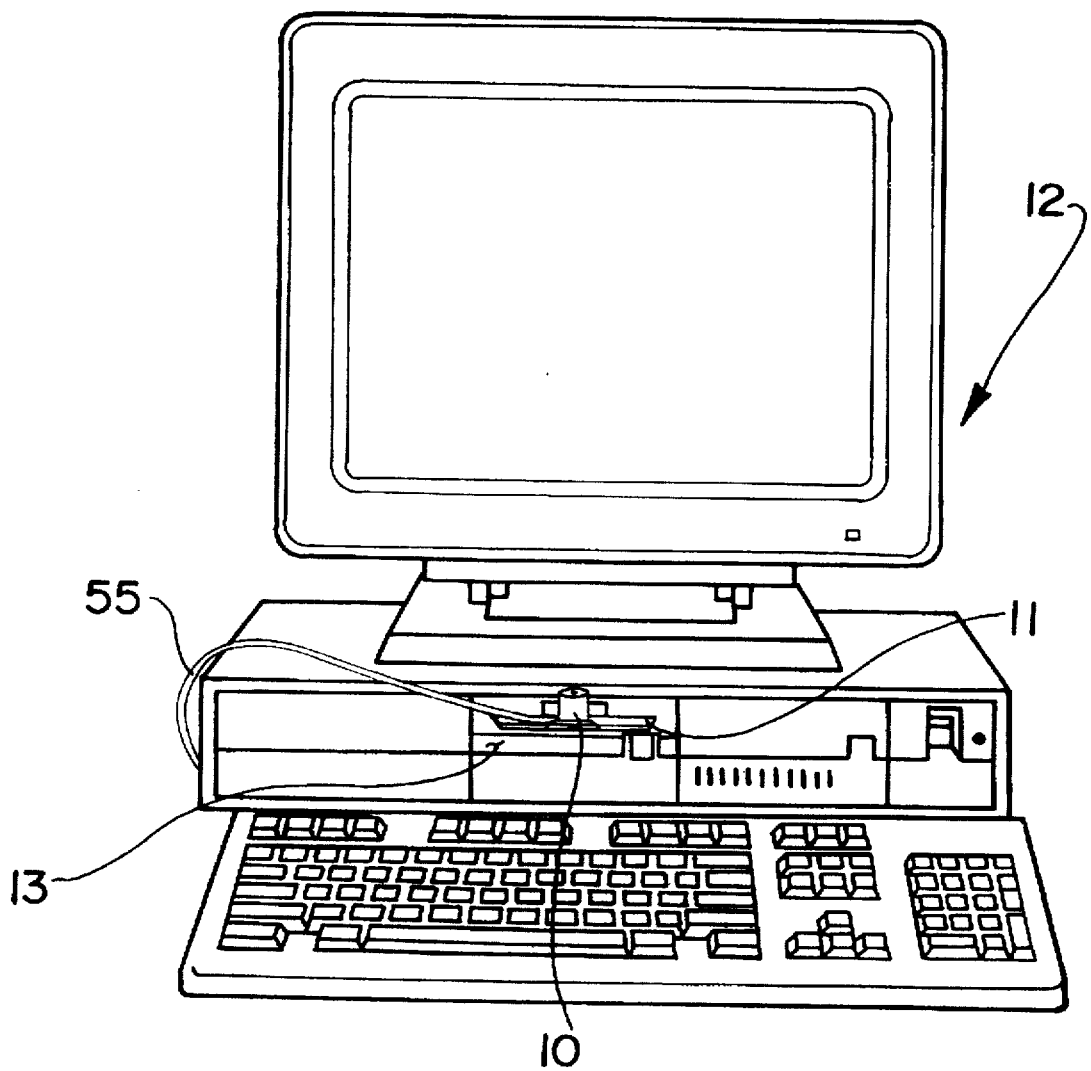
FIG. 1 is a front elevational view of a typical desk-top personal computer ("PC") equipped with the locking device of the present invention.
Figure 2:
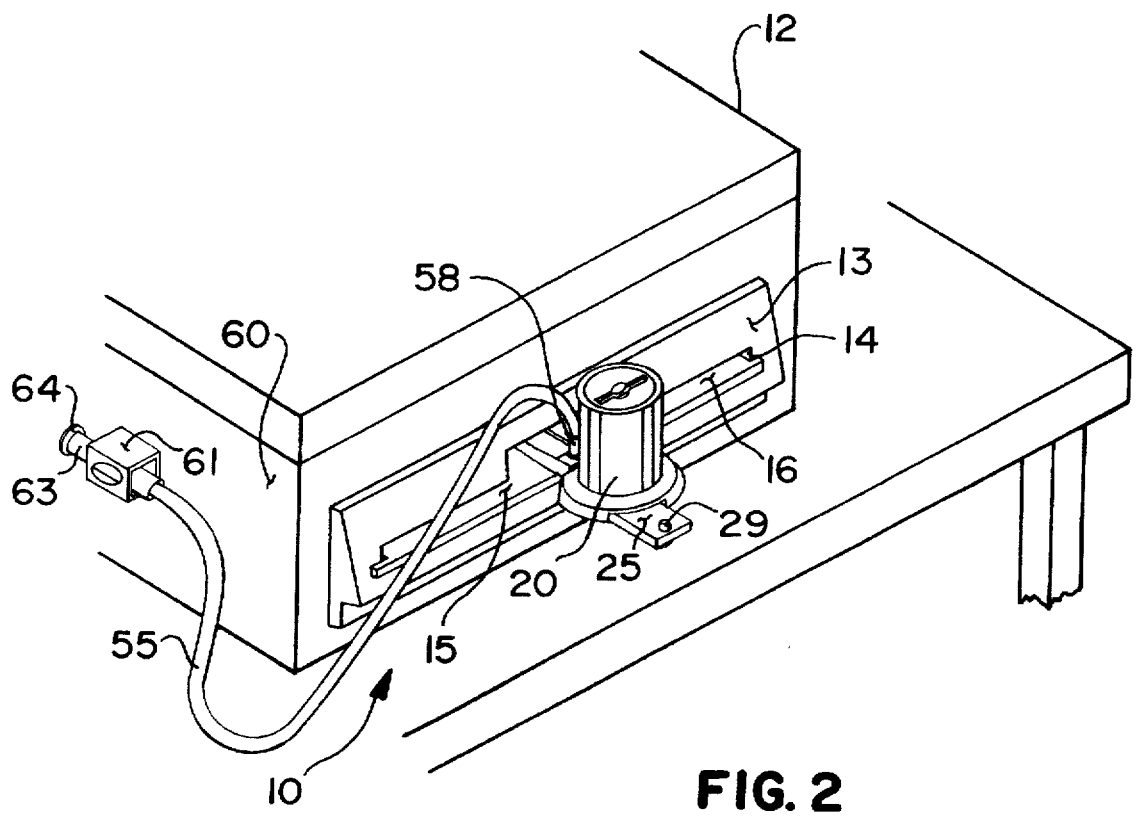
FIG. 2 is a perspective view of the locking devices of the present invention drawn to an enlarged scale and installed within the disk drive.

With reference to FIG. 1, a locking device 10 of the present invention is installed in the disk drive 11 of a personal computer (PC) 12, which may be any PC of a wide variety of PCs including desk-top PCs, lap and notebook PCs. The disk drive 11 is standard and accommodates 3½ inch and 5½ inch floppy disks. The disk drive 11 has a front cover 13 provided with an opening 14 through which a conventional floppy disk (not shown) is inserted. The opening can be either horizontally or vertically positioned.

With reference to FIGS. 2–5 and 18–20, the locking device 10 includes a pair of pivoted plates 15, 16. Each plate 15, 16 has a relieved (or thinner) portion 17, such that the plates 15, 16 may nest partially with respect to each other. The plates 15, 16 are connected together for pivotal movement by a suitable fastener, for example, a hinge (or rivet)

Figure 4:
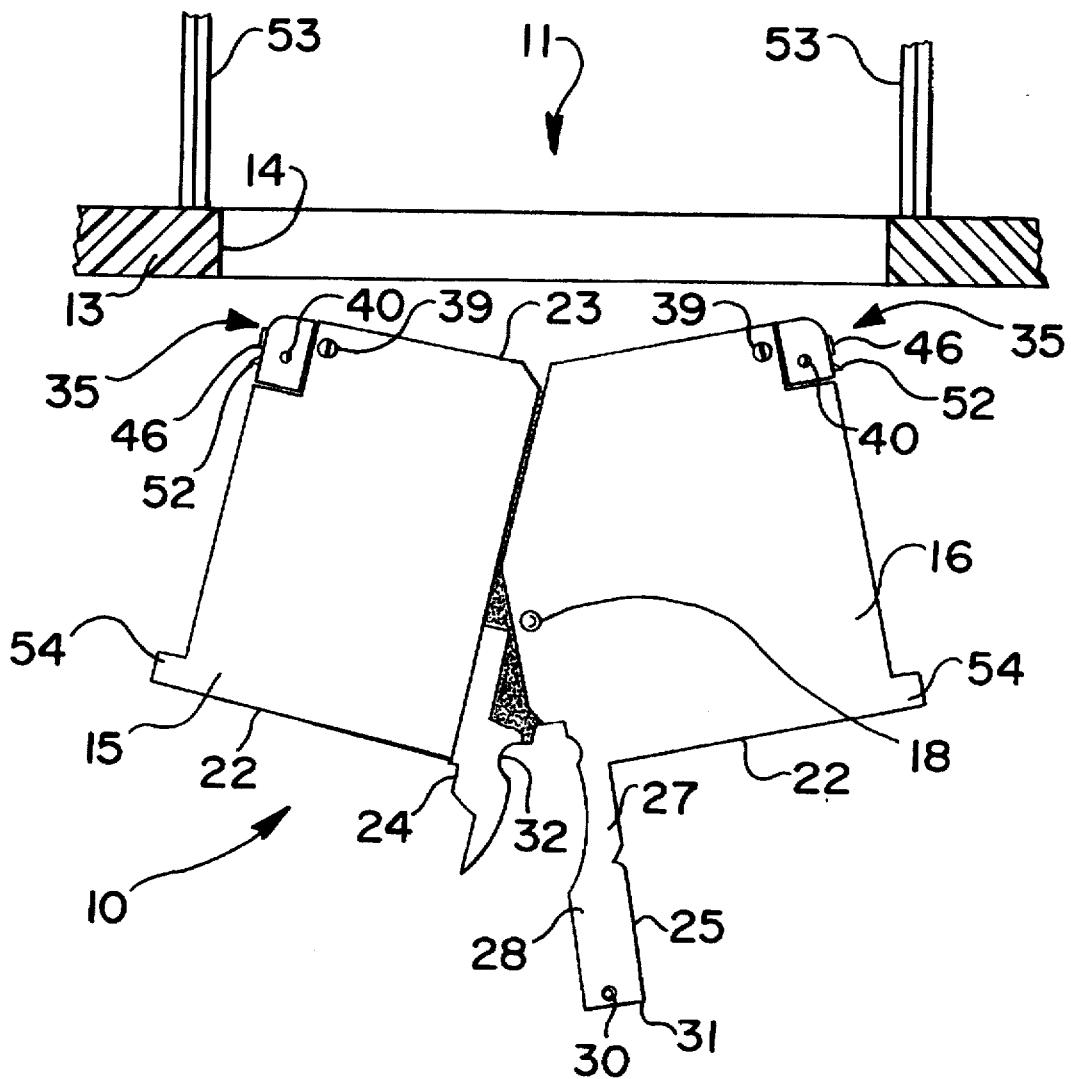
FIG. 4 shows the locking device of the present invention in its folded position for insertion into the disk drive.
Figure 5:
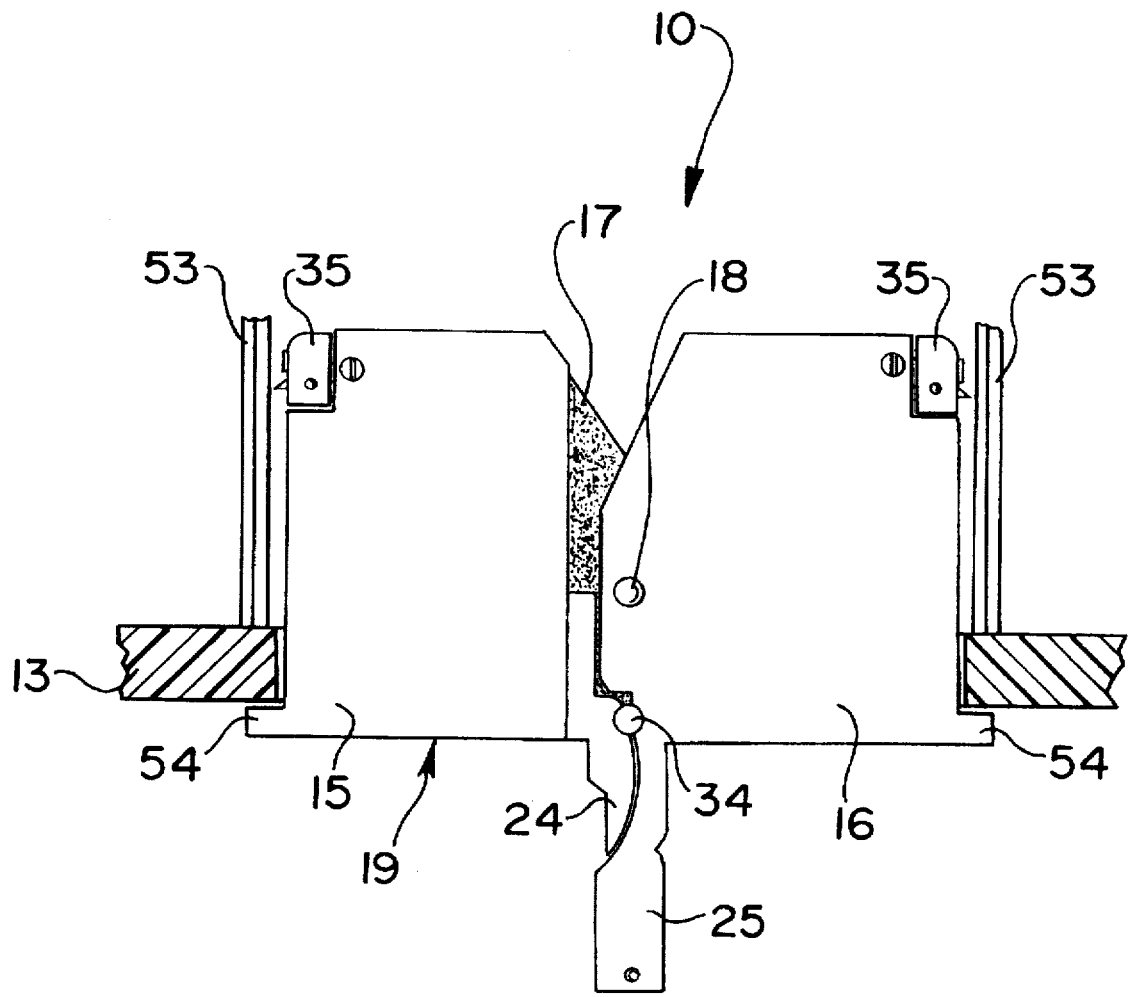
FIG. 5 shows the locking device of the present invention in its expanded locked position within the disk drive.
Figure 6:
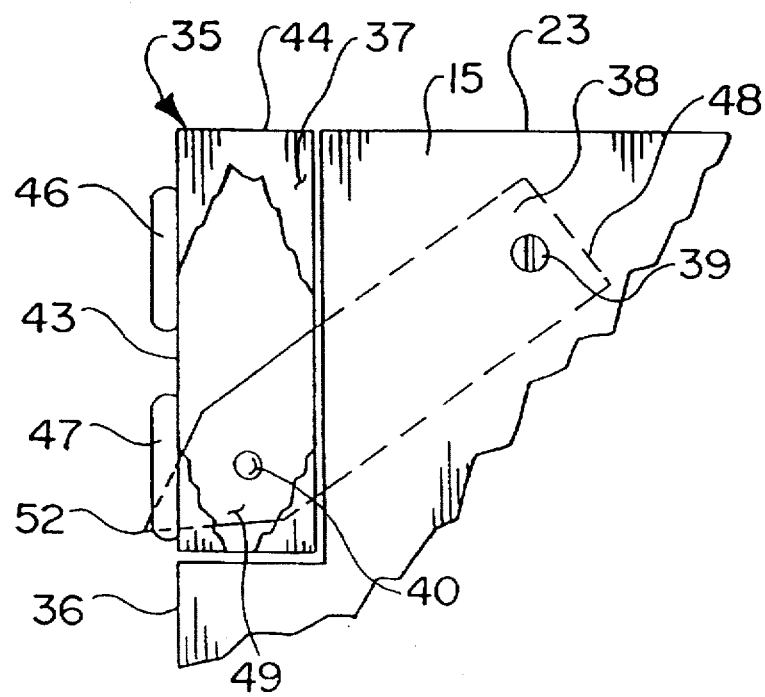
FIG. 6 is a top plan view of the arresting mechanism (drawn to an enlarged side) in its normal position.

18, such that the plates 15, 16 may be in a folded position (best shown in FIGS. 4, 19 and 20) or in expanded position (best shown in FIG. 5). Preferably, an elastomeric bushing (not shown) is disposed between the rivet 18 and the plates 15, 16.

As best shown in FIGS. 1–5 and 18–20, a removable lock (maintaining the plates 15 and 16 in their expanded position) is provided on an externally accessible portion 19 of the plates 15, 16 which extends outwardly of the opening 14 of the disk drive 11.

In a preferred embodiment of the present invention, the plates 15, 16 are maintained in their expanded position by a lock 20 which is a standard key-operated (or equivalent) lock well known to those skilled in the art, and which can be operated by a key 21 (or equivalent means).

As best shown in FIGS. 2–5 and 18–20, each plate 15, 16 has a proximal edge 22 and a distal edge 23. Fingers 24 and 25 extend from the proximal edge 22 of the plates 15 and 16, respectively, for carrying the lock 20. The finger 24 is a shorter finger, while the finger 25 is a longer finger. When the plates 15, 16 are in their folded position and the fingers 24, 25 are spaced apart (best shown in FIGS. 4 and 20), the lock 20 is unlocked, and either remains at the longer finger 25 or is removed. When the plates 15, 16 are to be maintained in their expanded position (the fingers 24, 25 engage each other), the lock 20 is carried by both engaging fingers 24, 25 (best shown in FIG. 5) and is locked by the key 21. The lock 20 has a slot 26 for protruding the finger 25 alone, or both fingers 24, 25 such that the lock 20 can slidably reciprocate along the fingers 24, 25.

The longer finger 25 has a narrower portion 27 and a wider portion 28. At the narrower portion 27, the finger 25 engages the shorter finger 24. The width of the wider portion 28 substantially equals to the sum of the width of the narrower portion 27 and of the width of the shorter finger 24 and is slightly smaller than the width of the slot 26 on the lock 20 to allow the fingers 24 and 25 to be protruded through the slot 26.

The lock 20 is prevented from falling down from the longer finger 25 by a screw 29 which is removably secured into the threaded opening 30 at the end 31 of the longer finger 25. In the unlocked state, the lock 20 can reciprocate between the screw 29 and the proximal edge 22 of the plates 15, 16. Preferably, the lock 20 is locked (when needed) in the location closest to the proximal edge 22 of the plates 15, 16.

Each plate 15, 16 has a respective groove 32, 33 at their proximal edges 22. The grooves 32, 33 are aligned such that, when the plates 15, 16 are in their expanded position, the grooves form a substantially circular opening 34 (discussed below).

Figure 20:
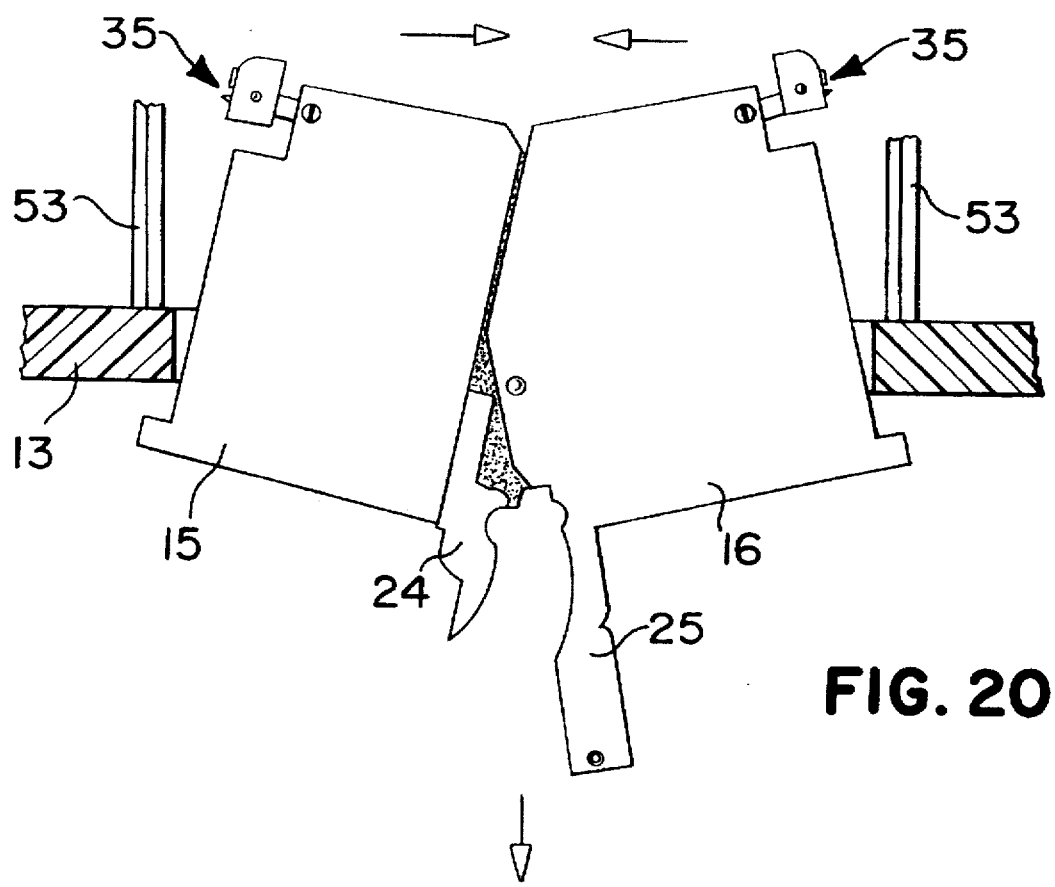
FIG. 20 is a plan view, corresponding substantially to FIG. 19, showing the locking device within the disk drive.

With reference to FIGS. 3–17 and 20, an arresting mechanism 35 is provided on a side edge 36 of each plate 15, 16. When the locking device 10 (as shown in FIGS. 4 and 5) is slidably inserted (in its expanded or folded position) into the opening 14 in the disk drive 11, the arresting mechanism 35 prevents an authorized removal of the locking device 10 out of the opening 14, and the locking device 10 can be removed only if the lock 20 is unlocked or removed. Then the plates 15, 16 can transform into their folded position and, as best shown in FIG. 20, can be removed.

The arresting mechanism 35 can be in its normal position (best shown in FIGS. 3–8A) and in its expanded position (best shown in FIGS. 8B–15 and 20).

The arresting mechanism 35 includes a main body 37, an arm 38, and a pair of pins 39 and 40 pivoting the arm 38 with respect to the plates 15, 16 and with respect to the main body 37.

The main body 37 is an integral piece of plastic or rubber and has a bottom wall 41 and a top wall 42 spaced from the bottom wall 41 by a side walls 43 and 44. When the arresting mechanism 35 is in its normal position, the side wall 43 coincides with the side edge 36, while the side wall 44 coincides with the distal edge 23 of the plates 15, 16.

Figure 3:
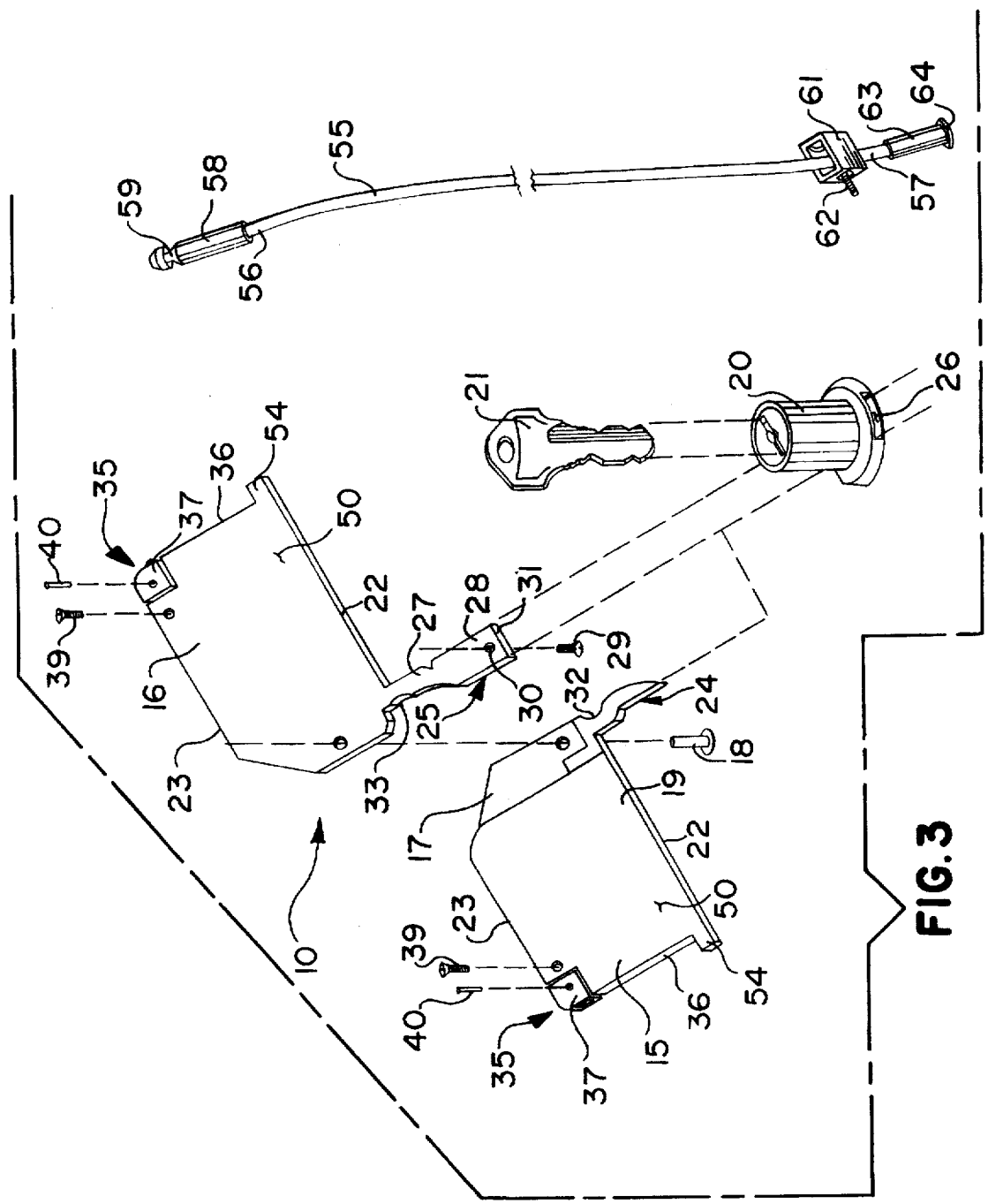
FIG. 3 is an exploded perspective view of the components of the locking device of the present invention.
Figure 7:
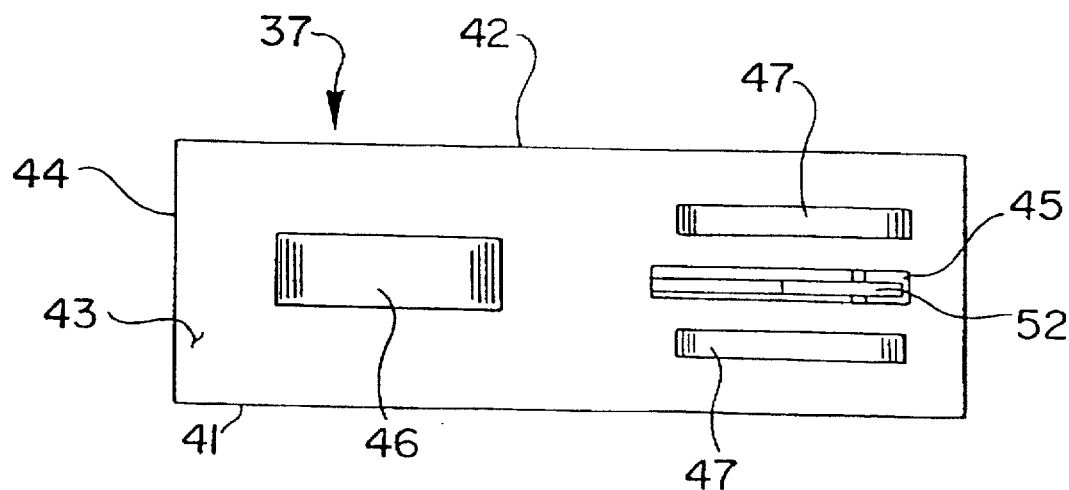
FIG. 7 is a side view of the arresting mechanism (drawn to an enlarged scale) in its normal position.
Figure 8B:
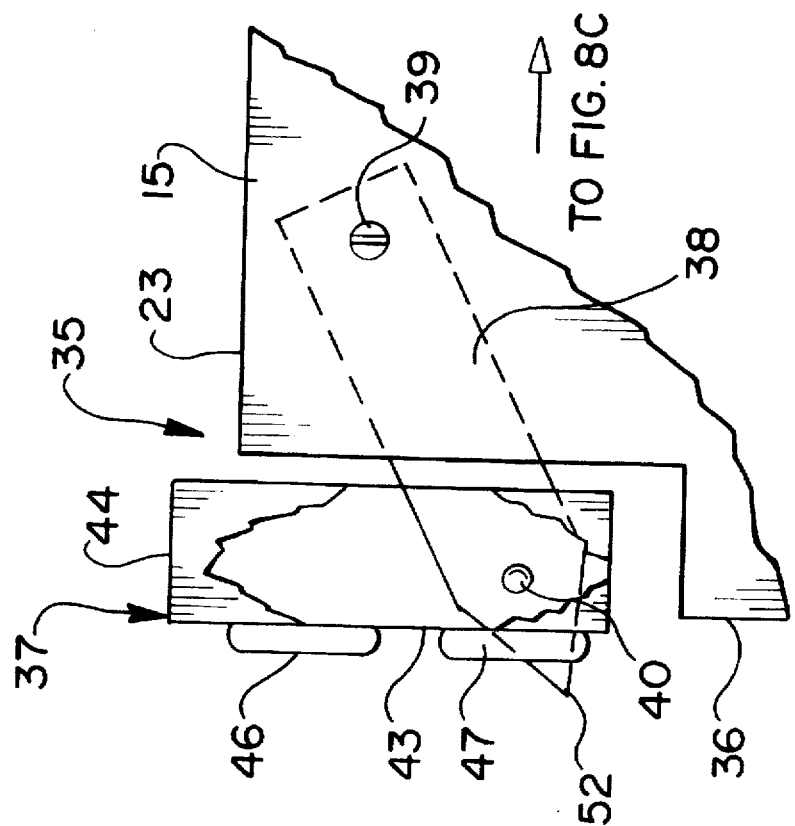
Figure 8A:
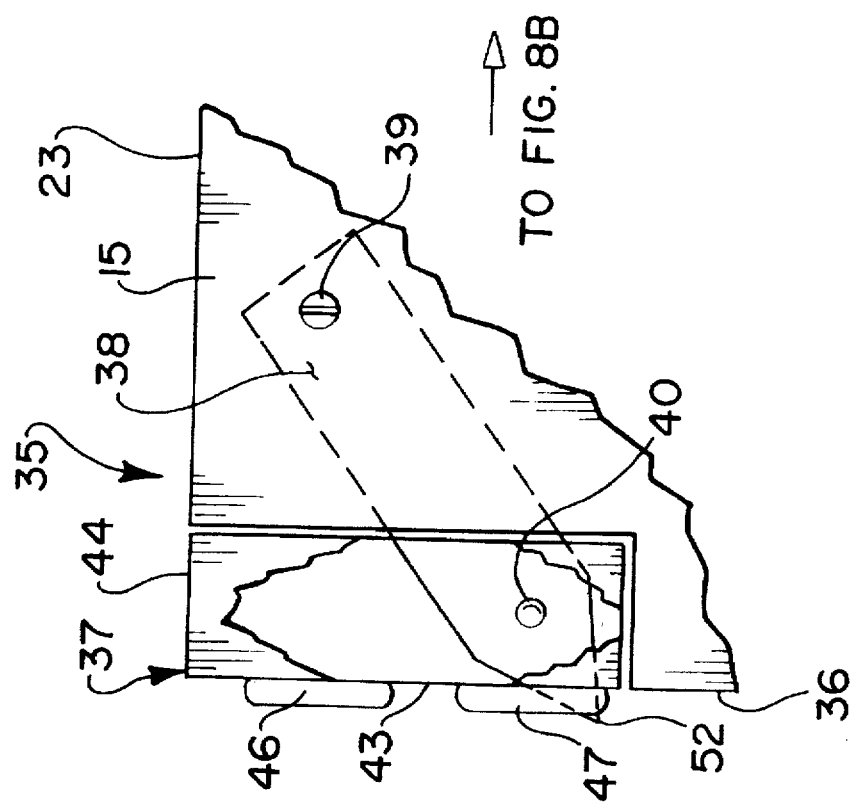

As best shown in FIGS. 3 and 7, the side wall 43 has a slot 45 extending a part of the length of the side wall 43. A first rubber foot 46 and a pair of second rubber feet 47 are provided on the side wall 43. The second rubber feet 47 are spaced apart by the slot 45 and extend approximately the length of the slot 45. The first and second rubber feet 46 and 47 extend substantially parallel between the bottom and the top walls 41 and 42, respectively.

The pivot pin 39 pivotally secures a first end 48 of the arm 38 to the plates 15, 16 within a respective cavity between an upper wall 50 and a lower wall 51 of the plates 15, 16 (discussed below), and the pivot pin 40 pivotally fastens a second end 49 of the arm 38 to the main body 37 within the cavity formed by the bottom wall 41, top wall 42 and side walls 43, 44. It will be appreciated by those skilled in the art that the pivot pins 39 and 40 may be any suitable fastening means, and may include a hinge, rivet, screw or equivalent. Preferably, the pins 39 and 40 are of the same length, such that they can maintain the arm 38 substantially parallel between the upper 50 and the lower 51 surfaces (or walls) of the plates 15, 16 and between the bottom and top walls 41 and 42.

Preferably, elastomeric bushings (not shown) are disposed on the pins 39, 40.

The second end 49 of the arm 38 has a teeth-shaped edge 52 which protrudes through the slot 45 between the second rubber feet 47.

Figure 9:
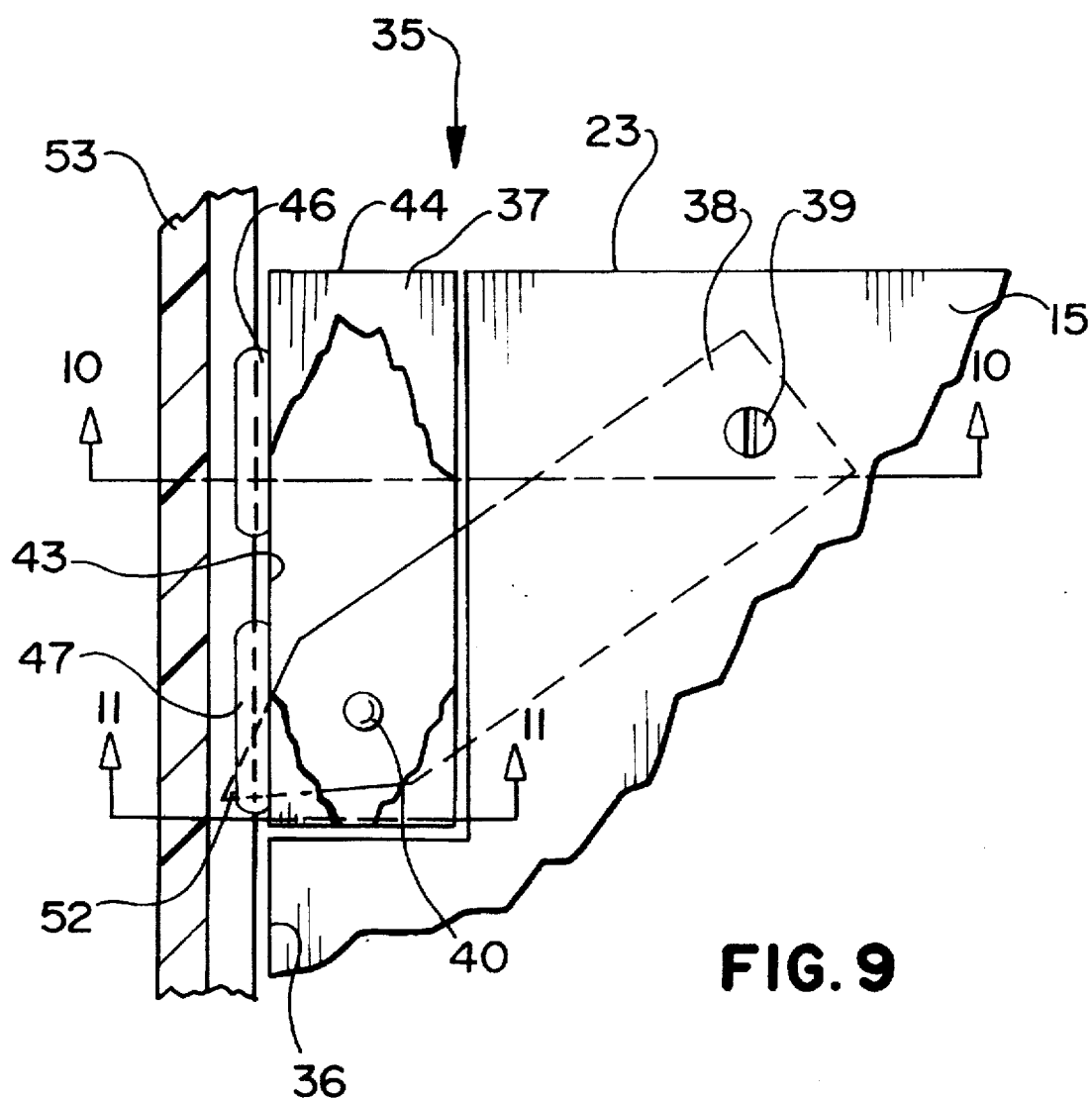
FIG. 9 is a top plan view (drawn to an enlarged scale) of an arresting mechanism (in its normal position) carried by one of the pivoted plates within the disk drive.
Figure 10:
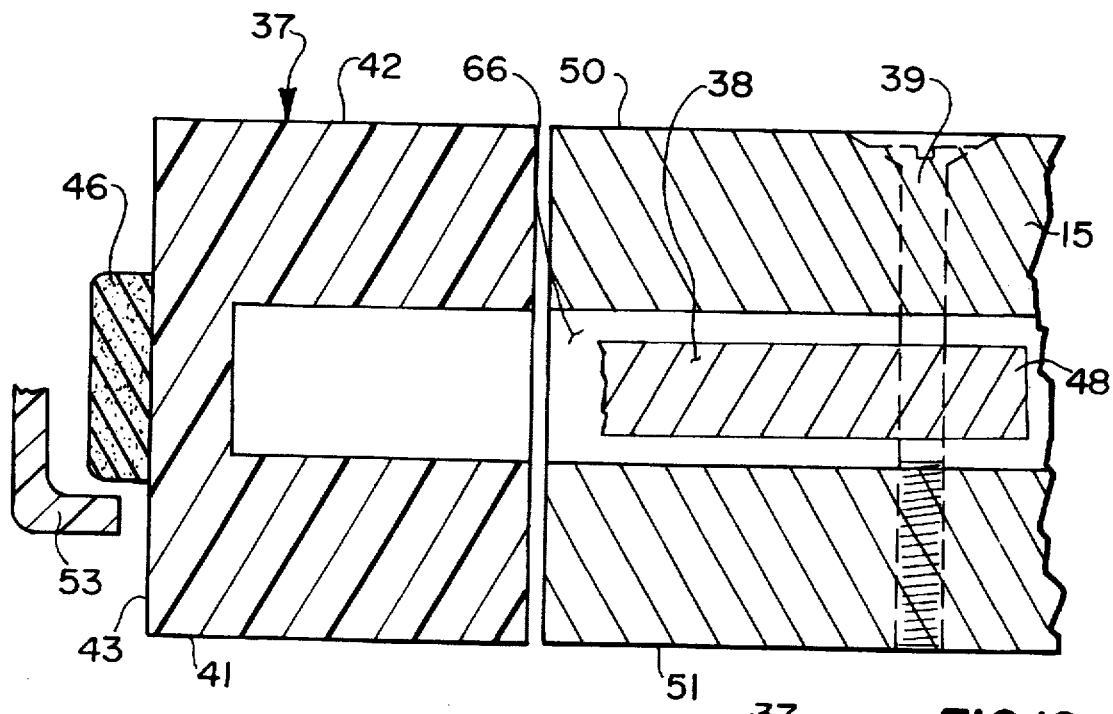
FIG. 10 is a cross-sectional view of FIG. 9 taken along lines 10—10.
Figure 11:
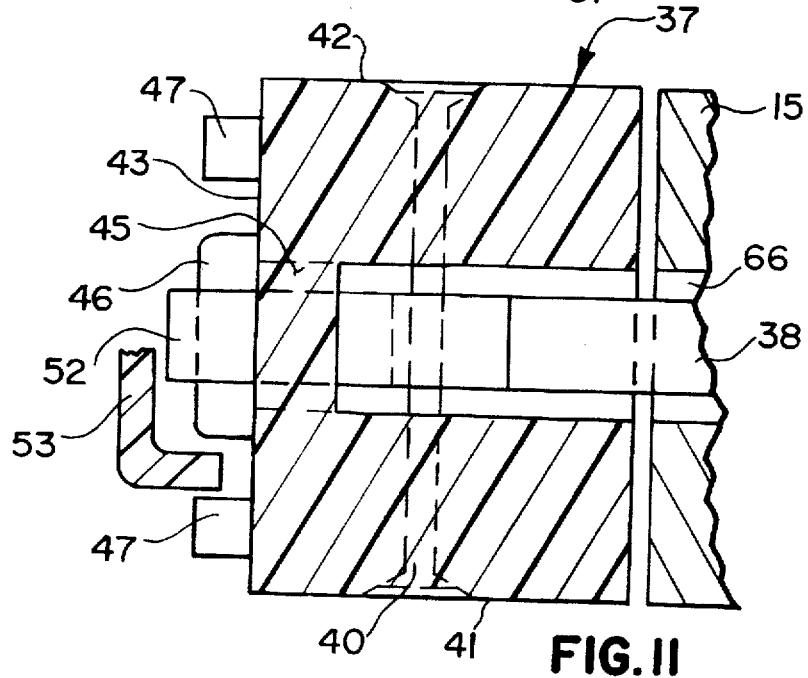
FIG. 11 is a cross-sectional view of FIG. 9, taken along lines 11—11.

As best shown in FIGS. 7–9, when the locking device 10 is slidably inserted into the opening 14, the arresting mechanism 35 is in its normal position. A pair of standard spaced-apart guide rails 53 is provided within the disk drive 11, one on each side of the opening 14, for insertion of a floppy-disk (not shown). If the locking device 10 is inserted into the opening 14 in the folded position, the arresting mechanism does not engage the guide rails 53. If the locking device is inserted in its expanded position, then during the insertion, the first rubber foot 46 and the teeth-shaped edge 52 of the arm 38 smoothly slide along and inside of the respective guide rail 53, while the second rubber feet 47 slide outside the guide rail 53.

It will be understood, that during the insertion and until the locking device 10 is attempted to be removed, the arresting mechanism 35 remains in its normal position, and the teeth-shaped edge 52 engages the respective guide rail 53 smoothly and easily. The angle of positioning of the arm 38 tends during insertion to be pivoted counter-clockwise, thereby keeping the arresting mechanism 35 in its normal position (as best shown in FIGS. 6, 7 and 9–11).

The locking device 10 can be inserted into the-opening 14 only a certain desired length thereof, which is controlled by side extensions 54 placed at the proximal edge 22 and extending from the side edges 36 of the plates 15, 16.

Figure 12:
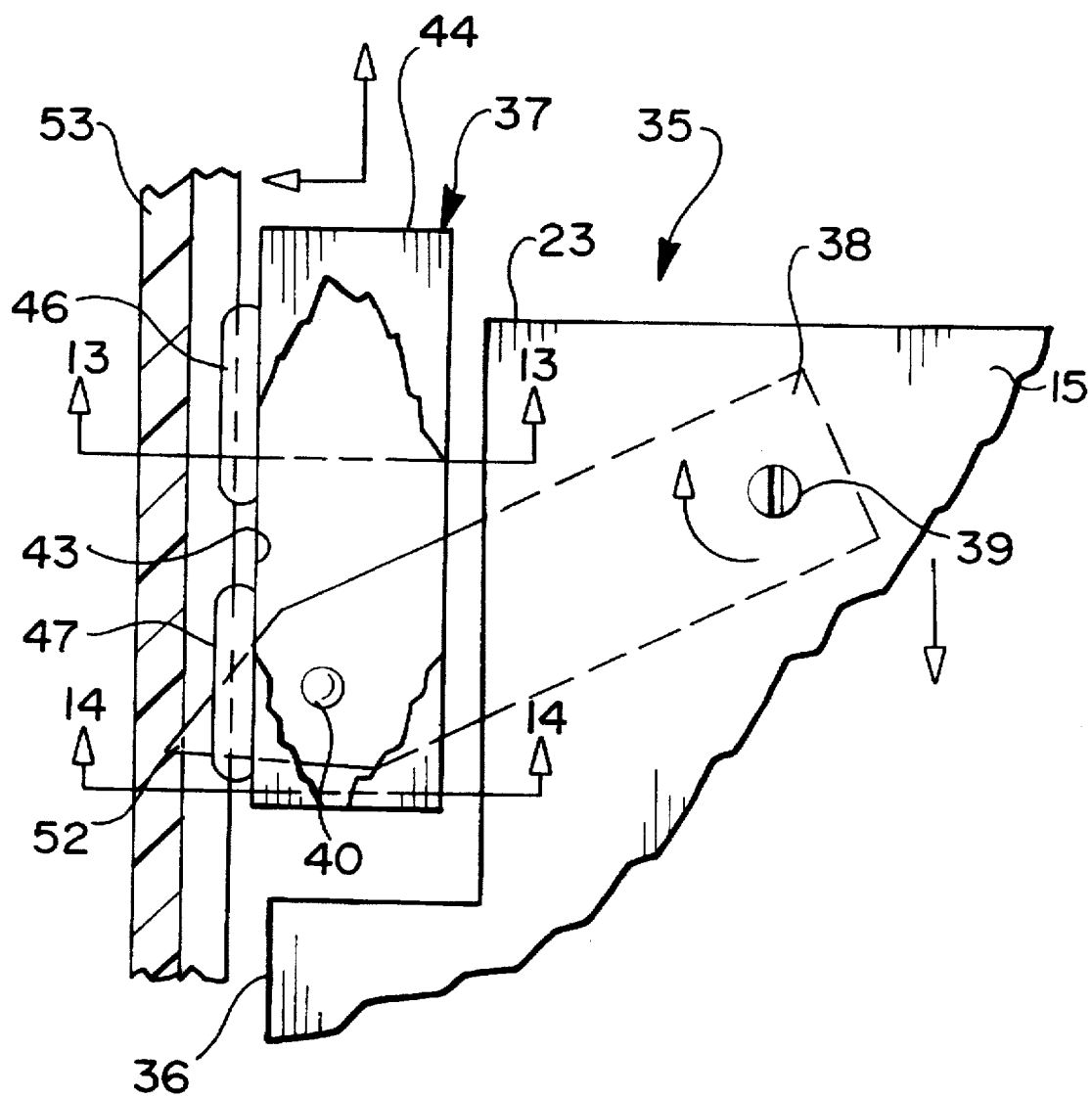
FIG. 12 is a further top plan view corresponding substantially to FIG. 9, but showing the "activation" of the arresting mechanism in the event that an attempt is made to remove the locking device (in its expanded position) from the disk drive.
Figure 13:
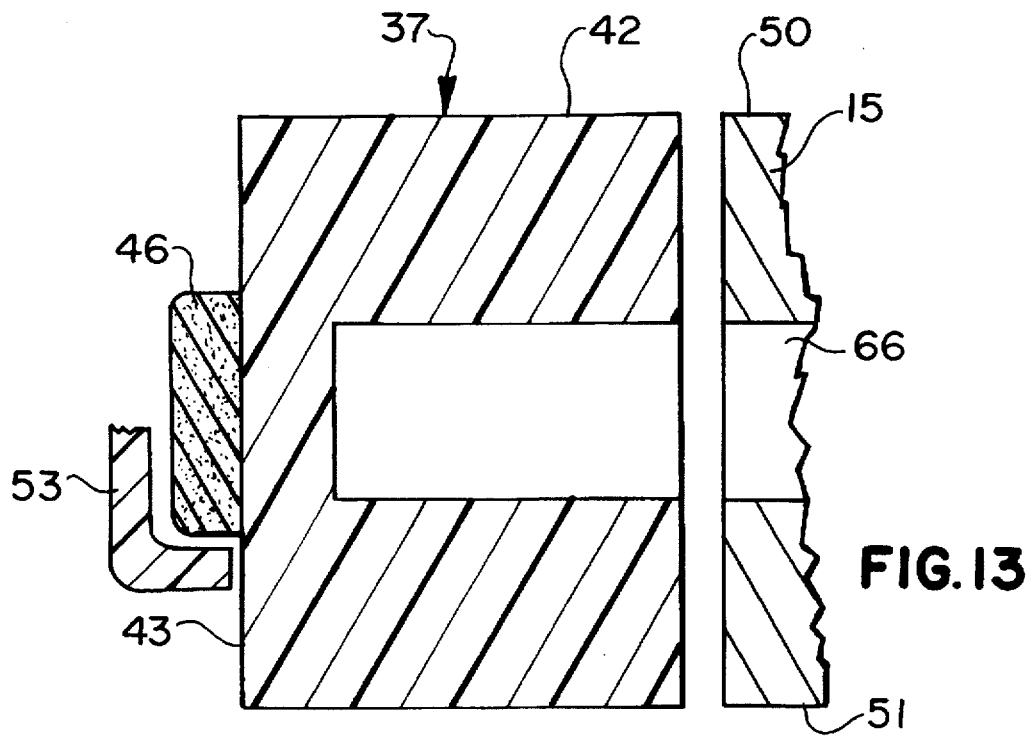
FIG. 13 is a cross-sectional view, taken along lines 13—13 of FIG. 12.
Figure 14:
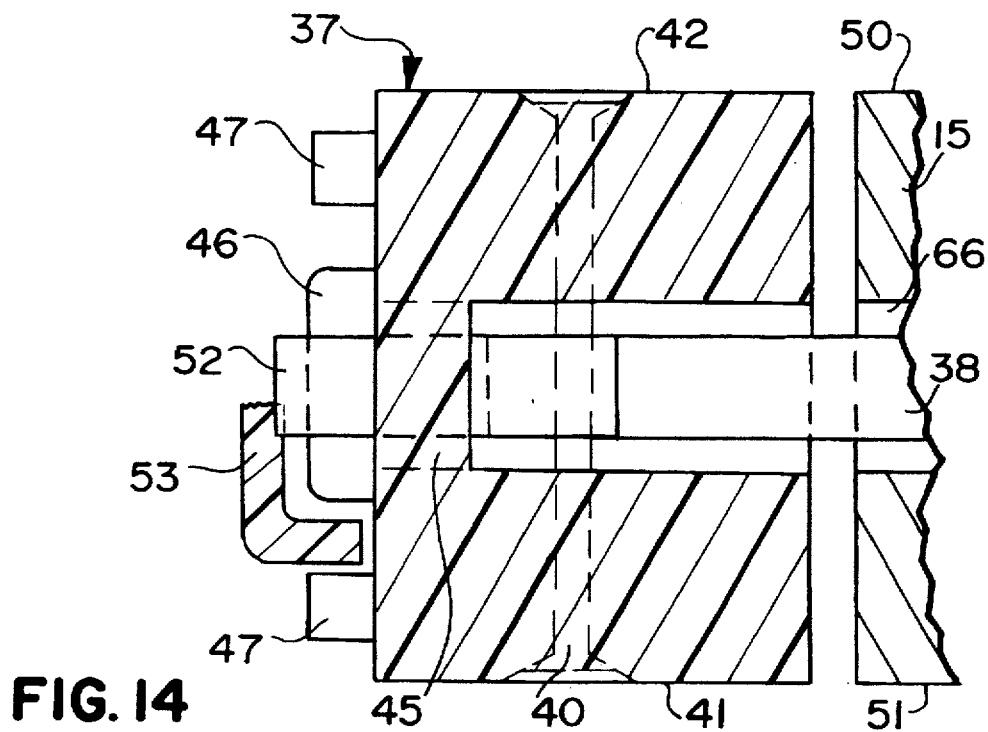
FIG. 14 is a cross-sectional view, taken along lines 14—14 of FIG. 12.

As soon as an attempt is undertaken to slidably remove the locking device 10 (in its expanded position), then the teeth-shaped edge 52 engages and "bites" into the adjacent respective guide rail 53 (as best shown in FIGS. 12–14) thereby activating the arresting mechanism 35. The arm 38 tends to rotate clockwise, and the arresting mechanism 35 starts to transform into its expanded position, i.e. the main body 37 moves out of its normal position and is forced closer to the adjacent respective guide rail 53.

Figure 15:
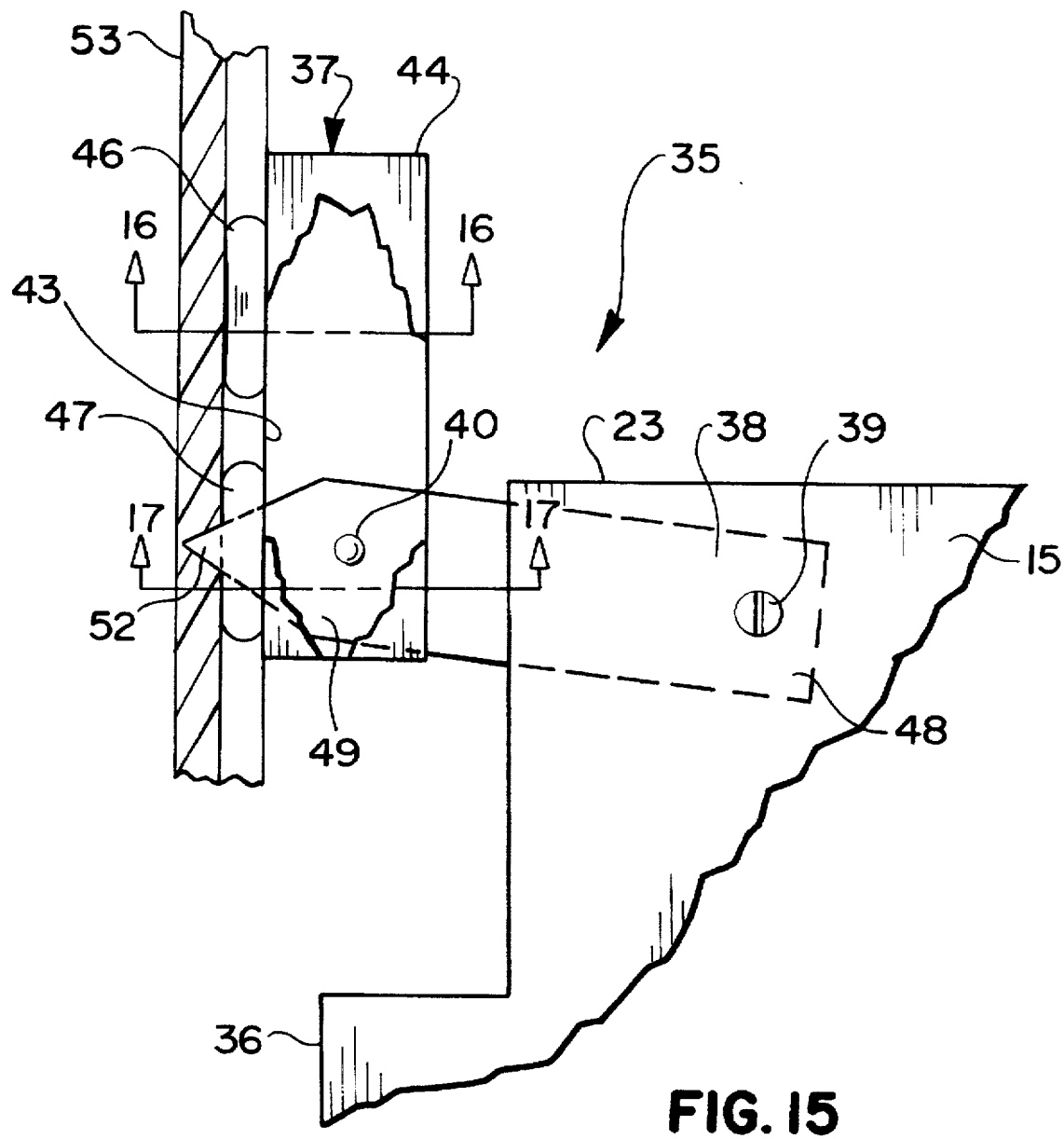
FIG. 15 is a further top plan view corresponding substantially to FIGS. 9 and 12, but showing the arresting mechanism in its fully expanded position stopping the locking device (in its expanded position) within the disk drive, thereby preventing the locking device (in its expanded position) from being removed out of the disk drive.
Figure 16:
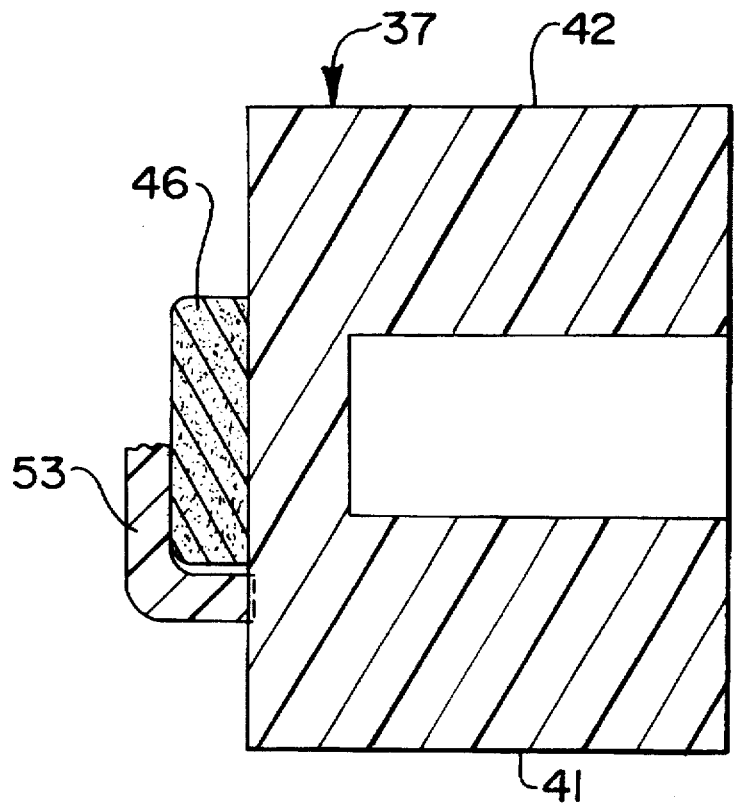
FIG. 16 is a cross-sectional view of FIG. 15 taken along lines 16—16 thereof.
Figure 17:
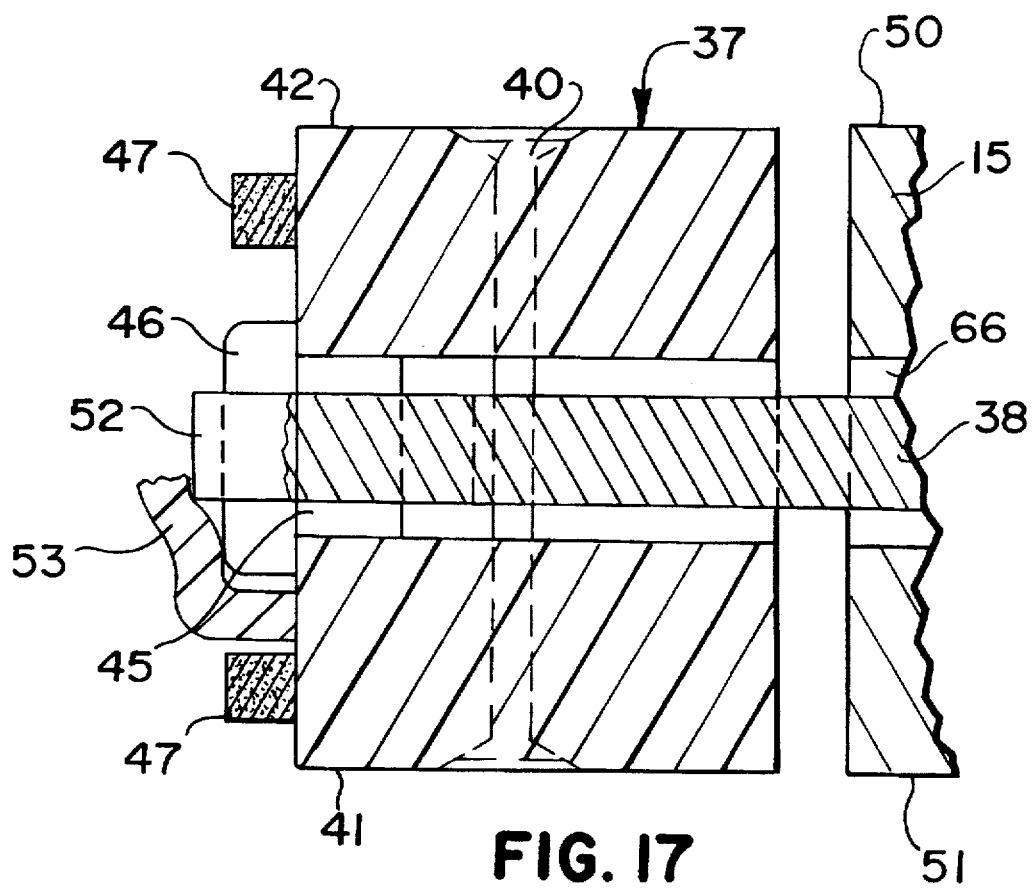
FIG. 17 is a cross-sectional view of FIG. 15, taken along lines 17—17 thereof.

If the removal attempt continues, the situation becomes more aggravated. As shown in FIGS. 15–17, further movement of the locking device 10 in the direction out of the opening 14, causes a larger degree of "biting" by the teeth-shaped edge 52, thereby flexing the guide rail 53 causing a further rotation of the arm 38 clockwise, and thereby transforming the arresting mechanism 35 to a maximal expanded position. The expansion of the main body 37 enforces the frictional and "biting" engagement between the teeth-shaped edge 52 and the respective guide rail 53, and arrests the locking device 10 inside the opening 14, thereby stopping the unauthorized removal of the locking device 10, and thereby preventing the unauthorized access to the disk drive 11.

It will be appreciated by those skilled in the art that the arresting mechanism 35 on another plate operates symmetrically to that one which is discussed above.

Figure 18:
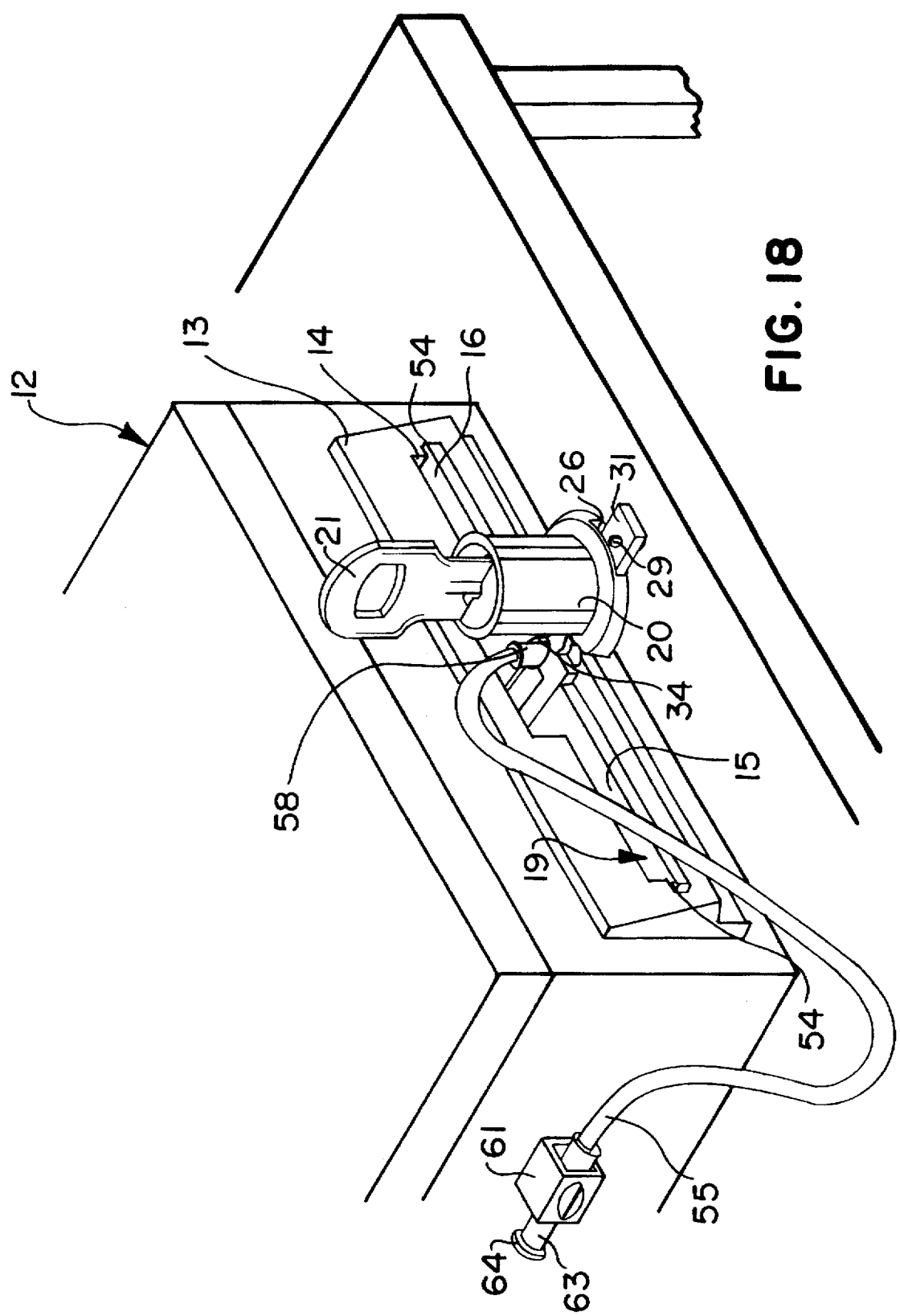
FIG. 18 is a perspective view, corresponding substantially to FIG. 2, but showing the locking device being unlocked.
Figure 19:
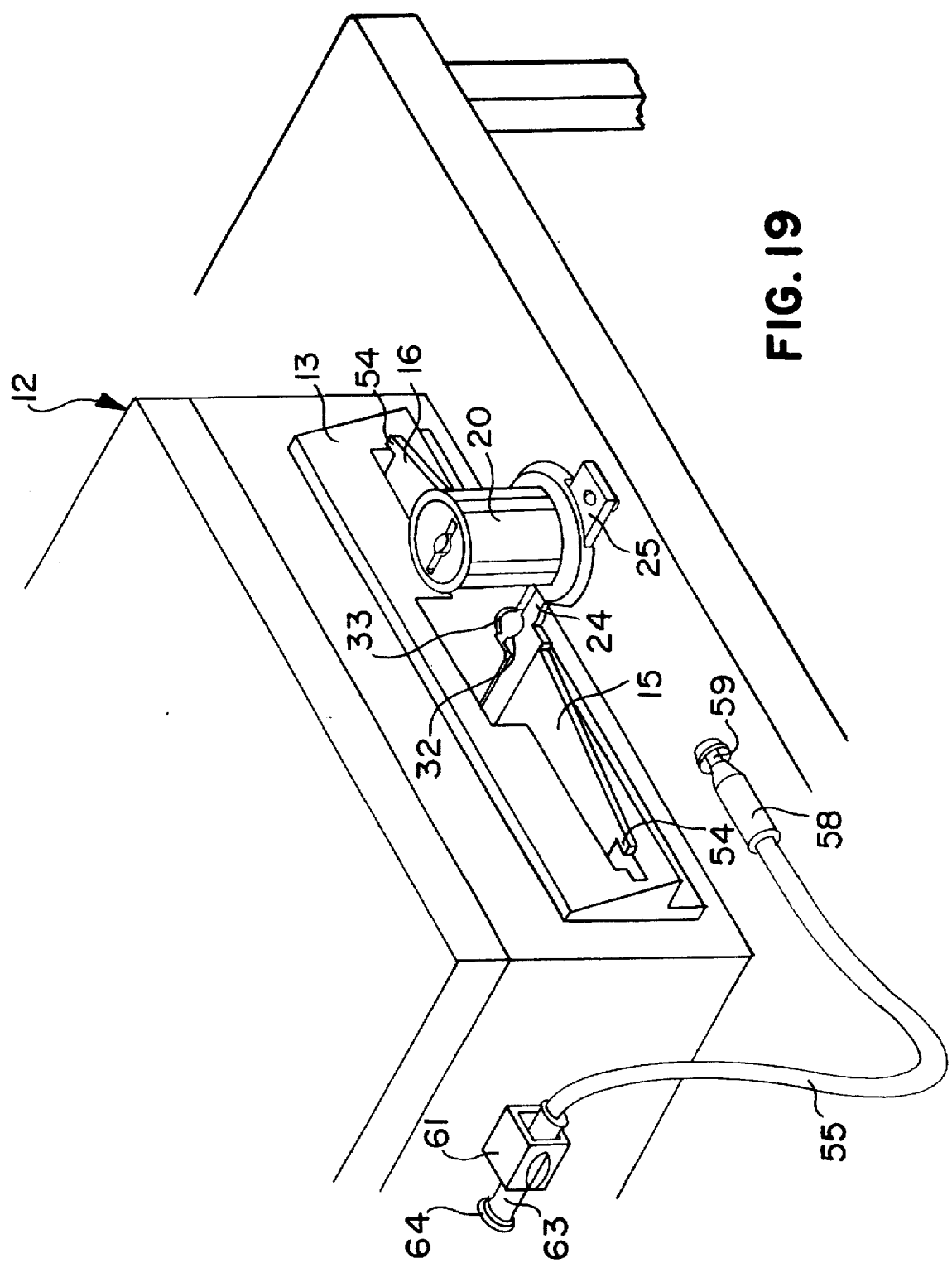
FIG. 19 is a further perspective view, corresponding substantially to FIG. 18, but showing the locking device folded for being removed from the disk drive.

As best shown in FIGS. 18–20, in order to remove the locking device 10, the lock 20 is unlocked (and removed, if desired), thereby allowing the plates 15 and 16 to be articulated back into their folded position, such that the locking device 10 can be easily removed.

A cable 55 may be provided (best shown in FIGS. 2, 3 and 21) for securing the locking device 10 to the PC 12. The cable 55 has a first end 56 and a second end 57. The first end 56 is secured within the opening 34 on the externally-accessible portion 19 of the plates 15, 16 (when the plates are maintained in their expanded position). The first end 56 terminates in a metal cylinder 58 having a narrower part 59 which is trapped in the opening 34 when the grooves 32 and 33 on the plates 15, 16 are brought together.

Figure 21:
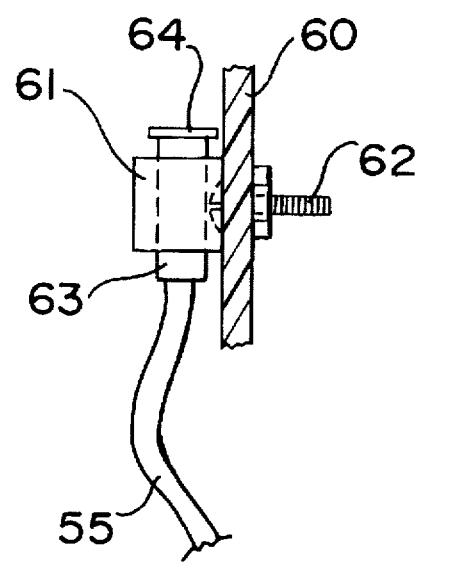
FIG. 21 shows in an enlarged scale a retaining means securing the end of the cable to a wall of the computer.

The second end 57 of the cable 55 is fastened to a wall 60 of the PC 12. The wall 60 can be a side wall or a back panel of the PC 12. As best shown in FIG. 21, the retainer 61 is fastened to the wall 60 by means of a screw 62. The second end 57 of the cable 55 is provided with a metal cylinder 63 having a flange 64, such that when the cable 55 is protruded through the retainer 61, the flange 64 restricts any further motion of the cable 55 and secures the second end 57 thereof in the retainer 61.

It will be appreciated by those skilled in the art that the retainer 61 can have, for instance, a circular or oval shape, instead of cubical, shown in FIG. 21 as one of examples.

The locking device 10 of the present invention is simple in use and in manufacturing. As best shown in FIG. 22, the arresting mechanism 35 having the body 37 with the arm 38 pivotally securing within the main body by the pin 40 can be manufactured as a separate module 65. The plates 15, 16 can be produced to obtain the cavity 66 (discussed above) between the upper 50 and lower 51 surfaces (or walls) of the plates 15, 16. At an assembling station (not shown), the arm 38 which sticks out of the module 65, is inserted into the cavity 66 in the plates 15, 16, and the pin 39 will be screwed into the plates 15, 16 to pivotally fasten the end 49 of the arm 38 to the plates 15, 16.

Obviously, many modifications may be made without departing from the basic spirit of the present invention. Accordingly, it will be appreciated by those skilled in the art that within the scope of the appended claims, the invention may be practiced other than has been specifically described herein.

I claim:

1. In combination with a computer including a disk drive, the disk drive having an opening therein and further having a pair of spaced-apart guide rails, one on each side of the opening,
a removable locking device for preventing unauthorized access to the disk drive, comprising:
a pair of plates, and
means for pivoting the plates together, such that the plates have a folded position and an expanded position;
wherein each of the plates has a distal edge and a respective side edge provided with an arresting mechanism having a normal position and an expanded position;
wherein, when the plates are slidably inserted into the opening in the disk drive, the arresting mechanism on the side edge remains in its normal position, and
wherein, when the plates, in their expanded position, are removed from the opening in the disk drive, the arresting mechanism is forced from the normal position into its expanded position for fictionally engaging a respective guide rail, thereby preventing the removable locking device from being removed from the opening in the disk drive.

2. In combination with a computer including a disk drive, the disk drive having an opening therein and further having a pair of spaced-apart guide rails, one on each side of the opening,
a removable locking device for preventing unauthorized access to the disk drive, comprising:
a pair of plates, and
means for pivoting the plates together, such that the plates have a folded position and an expanded position;
wherein each of the plates has a distal edge and a respective side edge provided with an arresting mechanism having a normal position and an expanded position;
wherein, when the plates are slidably inserted into the opening in the disk drive, the arresting mechanism on the side edge remains in its normal position, and
wherein, when the plates, in their expanded position, are removed from the opening in the disk drive, the arresting mechanism is forced from the normal position into its expanded position for fictionally engaging a respective guide rail, thereby preventing the removable locking device form being removed from the opening in the disk drive,
wherein said arresting mechanism comprises:
a main body,
an arm having a first end and a second end spaced therefrom, and
pivoting first and second pins;
wherein said first pin pivotally secures the first end of the arm to a respective one of said pair of plates, and said second pin pivotally secures the second end of the arm to the main body;
wherein the second end of the arm has a teeth-shaped edge protruding through the main body, such that when the locking device with the plates in their expanded position is being removed, said teeth-shaped edge fictionally engages the respective guide rail, thereby forcing the arm to be pivoted against the direction of movement of the locking device out of the disk drive, thereby expanding the main body out of its normal position, and thereby stopping any further movement of the locking device in said direction out of the disk drive.

3. The locking device of claim 2, wherein each of the plates has a relieved portion, such that the plates are partially nested in their folded position.

4. The locking device of claim 2, wherein the main body includes a bottom wall, a top wall, a first side wall and a second side wall, said side walls spacing the bottom wall from the top wall, wherein, when the arresting mechanism remains in its normal position, the first side wall coincides with the side edge of the respective plate and the second side wall coincides with the distal edge thereof;

wherein said first side wall has a slot extending a part of the length thereof and substantially parallel to and between said bottom and top walls, and wherein said teeth-shaped edge of the arm is protruded through said slot.

5. The locking device of claim 4, wherein each of said plates includes an upper wall and a lower wall, and wherein said first end of the arm is secured within a cavity formed by upper and lower walls of a respective plate therebetween.

6. The locking device of claim 4, wherein said second end of the arm is secured between said bottom and top walls of the main body.

7. The locking device of claim 4, further including a first rubber foot and a pair of second rubber feet provided on said first side wall and extending substantially parallel between said bottom and top walls of the main body, said second rubber feet being spaced apart by said slot, wherein, when the arresting mechanism engages a respective guide rail, the first rubber foot and the teeth-shaped edge of the arm are positioned inside of said respective guide rail, while the second rubber feet are positioned outside thereof.

8. The locking device of claim 2, wherein the plates are slidably inserted into the opening in the disk drive in their folded position.

9. The locking device of claim 2, wherein the plates are slidably inserted into the opening in the disk drive in their expanded position.

10. The locking device of claim 2, wherein said means for pivoting the plates together comprises a rivet between the plates.

11. The locking device of claim 2 further including a removable means for maintaining the plates in their expanded position.

12. The locking device of claim 11, wherein an externally-accessible portion of the plates extends outwardly of the opening of the disk drive, and wherein the removable means for maintaining the plates in their expanded position is carried by said externally-accessible portion.

13. The locking device of claim 12, wherein said removable means for maintaining the plates in their expanded position includes a key-operated lock, wherein each plate at the respective externally-accessible portion thereof has a proximal edge spaced from the distal edge thereof, and further includes a finger extending out of the proximal edge for carrying said key-operated lock.

14. The locking device of claim 13, wherein one of said pair of the plates includes a shorter finger, and another of said pair of the plates includes a longer finger, wherein, when the plates are in their folded position, the key-operated lock is carried by the longer finger, and when the plates are in their expanded position, then said longer and shorter fingers engage each other, and the key-operated lock is carried by both the longer and the shorter fingers.

15. The locking device of claim 14, wherein the key-operated lock slides along said longer and shorter fingers, and wherein the key-operated lock includes a slot through which the longer and shorter fingers protrude to carry the key-operated lock thereon.

16. The locking device of claim 15, wherein the longer finger includes a removable means preventing the key-operated lock from being loosened.

17. The locking device of claim 12, wherein the externally-accessible portion of each of the plates includes a groove, said grooves on each of the plates being aligned, thereby forming a substantially circular opening when the plates are in their expanded position.

18. The locking device of claim 17, further including a cable having a first end and a second end, wherein said first end of the cable is removably secured within said substantially circular opening on the externally-accessible portion of the plates in their expanded position, and wherein said second end of the cable is secured to a wall of the computer.

19. The locking device of claim 12, further including a side extension provided at the side edge of each plate at the externally-accessible portion thereof, said side extensions engaging the side of the disk drive opening to restrict the insertion of the locking device thereinto.

* * * * *